United States Patent [19]

Klingel

[11] 4,403,134

[45] Sep. 6, 1983

[54] METHOD AND APPARATUS FOR CUTTING BY MEANS OF A LASER BEAM

[75] Inventor: Hans Klingel, Möglingen, Fed. Rep. of Germany

[73] Assignee: Trumpf GmbH & Co., Fed. Rep. of Germany

[21] Appl. No.: 359,069

[22] Filed: Mar. 17, 1982

[30] Foreign Application Priority Data

Mar. 17, 1981 [DE] Fed. Rep. of Germany ....... 3110235

[51] Int. Cl.³ ............................................. B23K 27/00
[52] U.S. Cl. ...................... 219/121 LG; 219/121 LN; 219/121 FS; 219/121 LY
[58] Field of Search ................. 219/121 LG, 121 LN, 219/121 FS, 122 LK, 121 L, 121 LM, 121 LY

[56] References Cited

U.S. PATENT DOCUMENTS

| | | | |
|---|---|---|---|
| 3,679,863 | 7/1972 | Houldcroft et al. | 219/121 FS X |
| 4,201,905 | 5/1980 | Clark et al. | 219/121 LK |
| 4,324,972 | 4/1982 | Furrer et al. | 219/121 LG X |
| 4,335,296 | 1/1982 | Bredow | 219/121 LK |

Primary Examiner—C. L. Albritton
Attorney, Agent, or Firm—McGlew and Tuttle

[57] ABSTRACT

A device for cutting workpieces, for example at a work station or place over which the workpiece is movable comprises a laser beam device for directing a laser beam at the workpiece at the workpiece station and means for directing a fluid coolant against the workpiece in the vicinity of the laser beam. The fluid coolant advantageously comprises a liquid such as water which is directed to the workpiece, preferably to intersect the laser beam at the intersection of the axis of the laser beam and the workpiece. In accordance with the inventive method, a quantity of coolant is applied to the workpiece and in accordance with the type of cutting that is taking place, this quantity changes for example if a sharp curvature or a discontinually continuity of cutting takes place in order to maintain the heat zone at a satisfactory temperature. The intensity of cooling may be made a function of the shape of the track followed by the workpiece and may be varied by a control device as to amount of coolant.

8 Claims, 3 Drawing Figures

METHOD AND APPARATUS FOR CUTTING BY MEANS OF A LASER BEAM

FIELD AND BACKGROUND OF THE INVENTION

This invention relates in general to cutting devices and in particular to a new and useful device for cutting workpieces with a laser beam and to means for cooling the workpiece during the cutting.

The invention relates to a method and device for cutting workpieces, particularly metal sheets, by means of a laser beam. Such cutting is known per se. The "surface of cut" is particularly neat and is obtained at a relatively high speed. In a way similar to other methods of cutting by burning through, which, however, do not result in such a satisfactory edge or surface of cut and leave a relatively wide track, the material is locally heated up so intensely that it evaporates. The heat dissipates into the neighboring areas of the workpiece, so that a gradual cooling takes place. This heat dissipation does not raise problems if straight or moderately curved paths are followed. However, a larger area becomes heated if a sharply curved portion or even an acute angle is to be cut. The reason is that within a certain relatively narrow zone, heat accumulates since it is transmitted from both sides but cannot dissipate quick enough in the opposite direction. Further, while negotiating a sharp curve or an angle, the speed of the tool relative to the concerned area is necessarily reduced. The insufficient heat dissipation results in a reduced quality of the edge of cut.

SUMMARY OF THE INVENTION

The invention is directed to a method and device with which an at least improved quality of the edge of cut can be obtained even at locations where the track follows a sharp curve or includes a discontinuity.

To this end, a device is provided, comprising a system of cooling with a liquid coolant, with the cooling jets impinging on the workpiece approximately at the location of entrance and/or exit of the laser beam. The cooling system is so dimensioned that even while cutting sharp curves or acute-angled portions, the involved area of the workpiece is cooled to a satisfactory degree and the edge of the cut remains unaffected by the produced heat, or at least is thereby affected less than in a device without the liquid coolant. With this design, it is easy to provide that at least one liquid jet impinges on both the side of the laser beam entrance, and the exit side, which is normally the underside of the workpiece, i.e. of the metal sheet. A particularly satisfactory cooling is obtained if the geometric axes of the liquid jet or jets and of the laser beam intersect at the entrance or exit point. However, satisfactory results are obtained even if the axes of the liquid jet and of the laser beam do not intersect, or are parallel to each other, provided that the liquid impinges in the immediate vicinity of the instanteous cutting spot. With a beam and liquid jets which do not intersect, special measures must be taken to ensure that even in a curved or discontinuous portion of the cut, the beam and jets remain associated in the same order, thus, for example, the liquid jet continues to precede the beam. This problem does not arise if the jets and the beam intersect at a location of beam entrance or exit of the workpiece, or if a plurality of liquid jets surrounding the beam, or a corresponding liquid apron, are provided.

It is therefore very advantageous to supply the coolant through a nozzle or the like, and to provide that the geometric axes of at least the outlet portion of the nozzle and of the laser beam or lens or the like, intersect at least substantially on the surface of the workpiece, about at the location of the entrance or exit of the beam. A major part of the heat is dissipated by the coolant before the heat can pass into the adjacent areas. By the way, due to the heat produced at the instantaneous cutting spot, the coolant evaporates to a large extent, and there is no need for conducting it away. Since the diameter of the coolant jet is normally a multiple of that of the laser beam, no problem arises with an orientation of the nozzle or nozzles in the direction of the cutting spot, and the device, or at least the nozzle and the orienting mechanism may be of relatively simple design.

A development of the invention provides that the nozzle is mounted for displacement, particularly along a circular path about the geometric axis of the laser beam. This makes it possible to effect the cooling in an area only adjacent, not directly coinciding with, the cutting spot, and in spite of that to guide the liquid jet or jets away always exactly along the track of curves or discontinuities are negotiated. What is needed in addition in this connection, of course, is a special device for effecting the necessary displacement. The device for controlling the laser cutter, or the workpiece, may be employed to this end.

Another variant of the invention provides that the cooling liquid can be supplied through an annular nozzle or the like, having its orifice associated with the laser beam exit of the workpiece. In this case, the axes of the annular nozzle and of the laser beam may extend coaxially or intersect. An intersection is advisable to avoid an other wise possible affecting or even damaging of the annular nozzle through heat and vaporized meterial, should the laser beam be directed against the nozzle. Another embodiment of the invention provides a device for controlling the pressure and/or amount of the coolant. This makes it possible to vary the cooling effect and adjust it to the actual shape of the cutting path. With a straight path, the amount may be throttled even to zero, while with a discontinuous path, or sharp curves, the maximum amount of liquid is supplied. The maximum supply is also advisable if narrow protrusions are cut, i.e. the variation in supply is not necessarily related to curvatures as such, and is rather postulated by the mass of material into which the heat can dissipate.

In view of the last mentioned conditions, it is particularly advantageous if the device for controlling the coolant is connected to the programmed control of the relative motion between the workpiece and the laser cutter. The program makes it possible to provide, or not to provide, a variation of the coolant supply along a portion which is slightly curved or straight. For example, with an elongated tongue to be cut out, the control may be such that while cutting one of the longitudinal sides of the tongue, little or no coolant is supplied, and while cutting the narrow end side and the other longitudinal side, the maximum amount of coolant is supplied.

Another advantageous possibility of controlling the coolant amount as a function of the track to be cut is to interconnect the device for controlling the coolant with a device for measuring the temperature of the workpiece in the instantaneous cutting area. This device will be used if no cutting program is provided, i.e., if the shape of the cut in the workpiece is determined by a template, or controlled by hand. The device for measuring the temperature must not affect the laser beam and must pick up the temperature close to the instantaneous cutting spot.

Another embodiment of the invention provides that the relative speed between the workpiece and the laser beam, and the intensity of the beam, are controlled to the effect that along a straight path, the speed is at its maximum relative to the output, while in a sharpest possible curvature or a discontinuity in the path, it is at its minimum, and that the laser output is small even if two adjacent straight cuts are made in immediate succession and the heat cannot readily escape to the sides.

Usually, such laser cutters are controlled by a program so that almost any contour and most various cuts can be produced automatically. By means of the program, the longitudinal and transverse positioning motion of the cutting tool or the workpiece is started, stopped, accelerated, or decelerated, so that a two-dimensional displacement is possible in virtually any direction. Now, it is not particularly difficult to modify the program and control of the workpiece or tool displacement by adding a control of the intensity of the laser beam as a function of the path to be cut. With a stationary laser cutter, the advance speed of the workpiece is anyway controlled by the program, so as to avoid an overshot in a smaller-radius portion or while cutting a corner. Consequently, the additional expenses for varying the intensity of the laser beam are relatively low in such a laser cutter. On the other hand, it is very advantageous for obtaining good results, if, in accordance with a further development of the invention, the control of the laser beam intensity is connected to the programmed device for controlling the relative motion between the workpiece and the beam.

Still another variant of the invention provides that the laser cutter, or the portion thereof emitting the laser beam, is stationary and the workpiece is displaceable longitudinally and transversely by means of cross slide-type mechanism, particularly in a plane which is perpendicular to the laser beam. This makes it possible to combine the laser cutter very advantageously with a device for machining the workpiece in a different manner, such as with a punching or nibbling tool. Then, advantageously, the same program may be used for the operation of both tools, with only the lateral spacing of the axes of the punch, etc. and the laser beam, being taken into account.

Another development of the invention provides that in addition to a control of the laser output and the advance speed of the workpiece, for example, a liquid coolant may be supplied, particularly in a controlled manner.

A method of cutting workpieces by means of a laser beam, in which the workpiece, particularly a plate-shaped one, and the laser cutter, or the laser portion thereof, are displaced relative to each other, provides, in accordance with the invention, that a liquid coolant is supplied to the instantaneous entrance and/or exit spot of the laser beam on the workpiece, at least during the period of time in which the relative displacement is arcuate or discontinuous. This is provided also in instances where a cut is made immediately after a closely adjacent cut made before. Finally, in accordance with a further development of the invention, the coolant amount is varied as a function of the curvature, or the shape of the discontinuity, with the supply being increased, relative to a slight curvature, if a sharper curvature or acute-angled discontinuity is to be negotiated.

Accordingly, it is an object of the invention to provide an improved device for cutting workpieces with a laser beam and which includes means for cooling the workpiece to maintain its temperature at a predetermined value.

A further object of the invention to provide a method of cutting a workpiece with a laser beam wherein coolant is applied to the workpiece in accordance with the type and mode of cutting which is being carried out.

A further object of the invention is to provide a laser beam cutting device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 2:
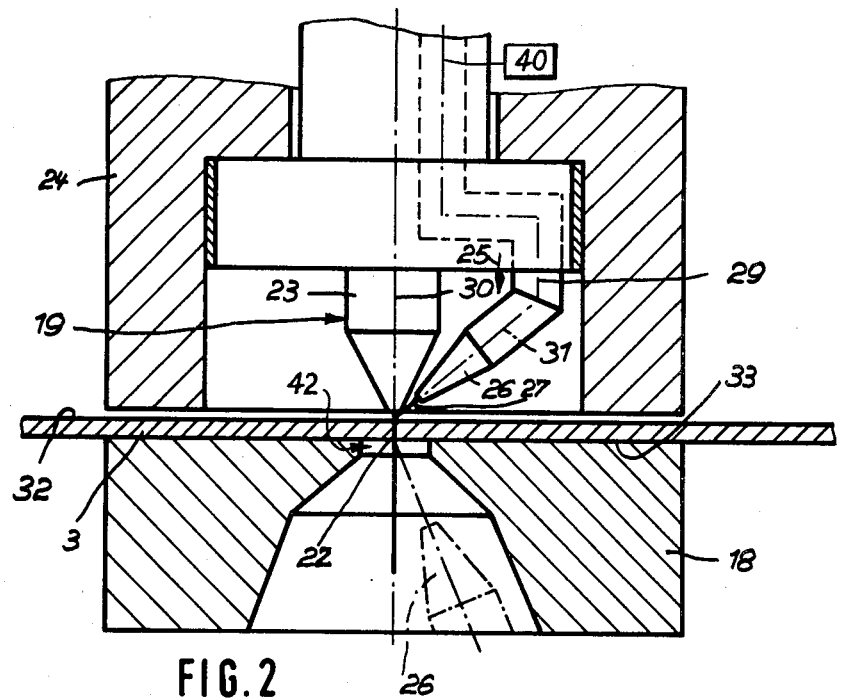
FIG. 2 is an enlarged partial detailed view of the cutter shown in FIG. 1.
Figure 3:
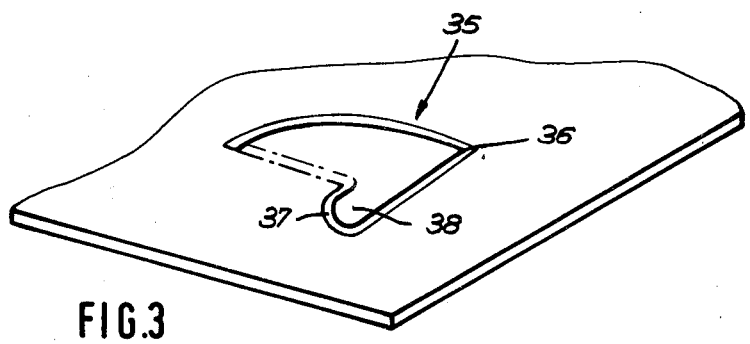
FIG. 3 is a perspective view of a workpiece showing a partial contour of the cut by the laser beam.

Referring to the drawings in particular the invention embodied therein comprises a device for cutting workpieces particularly metal sheets 3 and a work station as indicated at FIG. 2 over which the workpiece is movable and with a laser beam directed from a laser beam device 19 to the workpiece 3 with the means for directing a fluid coolant such as water from a supply 25 through a pump 28 and line 29 to be discharged from a nozzle 26 along an axis 27 which preferably intersects the axis 30 of the laser beam.

A substantially C-shaped machine frame 1 supports a coordinate positioning equipment 2 for a preferably plate-shaped workpiece 3, comprising a longitudinal positioner 4 and a transverse positioner 5. The longitudinal positioner 4 comprises a guide rail 6 firmly secured to machine frame 1, and a carriage 8 displaceable thereon as shown by the double arrow 7. The displacement is effected preferably by means of drive motor 9 rotating a pinion 10. The pinion engages guide rail 6 which is designed as a rack.

Carriage 8 further supports a second drive motor 11 rotating a pinion 12 which engages a supporting rail 13 which also is designed, at least partly, as a rack, or carries such a rack. By means of second motor 11, supporting rail 13 can be displaced in the direction of double arrow 14. The two directions of displacement are at right angles to each other.

Figure 1:
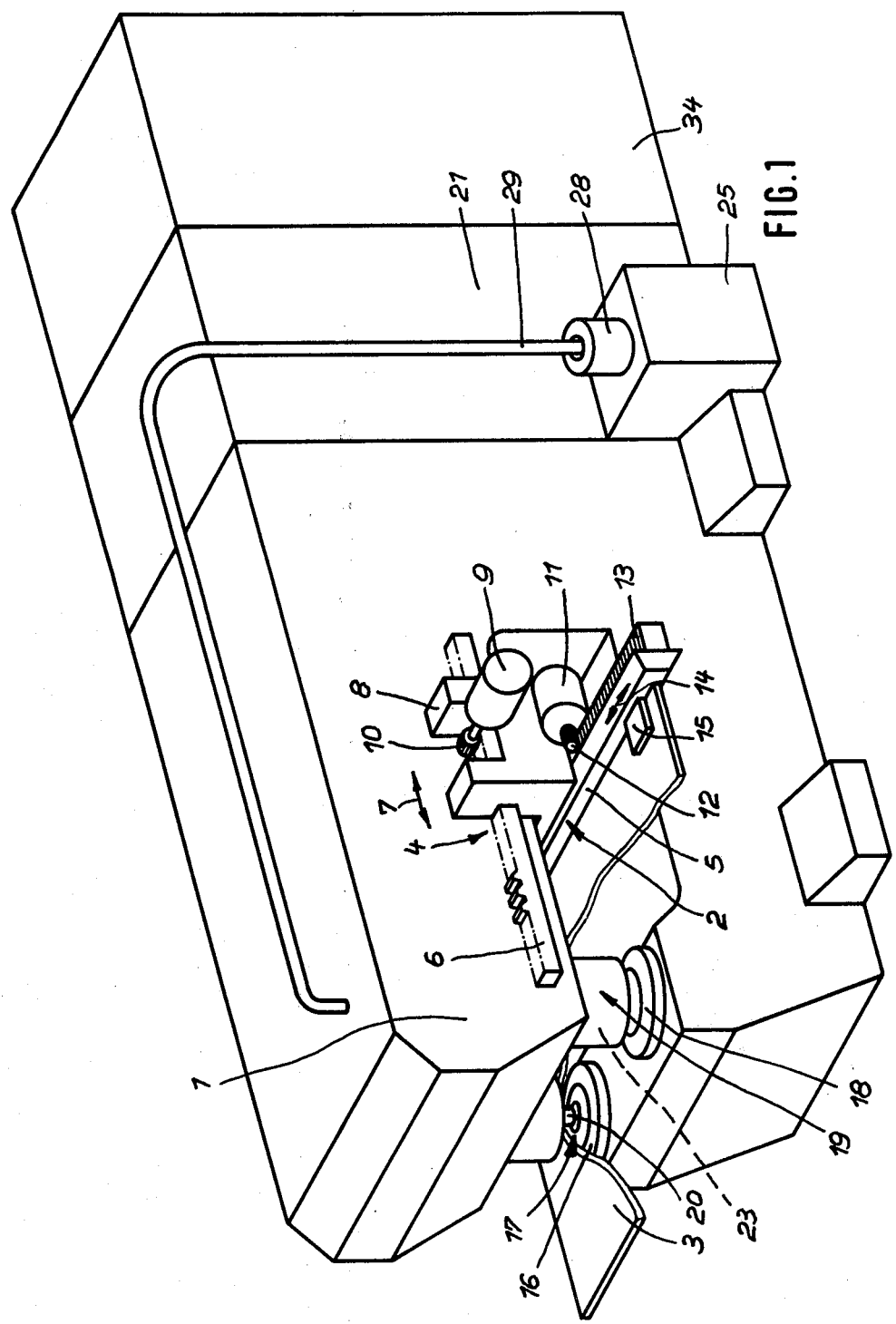
FIG. 1 is a diagrammatic perspective view of a combined machine for punching or nibbling at a laser cut constructed in accordance with the invention.

Supporting rail 13 preferably carries two lugs 15 between which the plate-shaped workpiece 3 is clamped and of which only one is visible in FIG. 1. By means of motor 9, the workpiece can be displaced in the direction of arrow 9, and by means of motor 11 in the directions of arrow 14. If both motors 9 and 11 run simultaneously, a superposed longitudinal and transverse displacement is obtained. Workpiece 3 bears in addition against the bottom die 16 of a punching device 17, and, if provided, against a rest 18 below a laser cutter 19. Die 16 of punching device 17 cooperates with a punch 20. Punching device 17 is of known design and there is no need for a description and showing in detail.

The control device of the laser cutter 19 is is diagrammatically indicated at 21 and comprises all elements necessary for producing a laser beam 22. FIG. 2 diagrammatically shows the tool part 23 including a device for focusing laser beam 22, and preferably being surrounded by a sort of a dome 24. The outlet of a cooling system 25 is disposed within dome 24 including a discharge nozzle 26 for the coolant jet 27 and a support thereof. (not shown). Nozzle 26 may be movable on a circular path around beam axis 30 by means shown schematically at 40.

The main part of the cooling system 25 is indicated in FIG. 1. The system comprises a pump 28 which is connected through a line 29 to nozzle 26. If both tool part 23 of laser cutter 19 and nozzle 26 with line 29 are provided at the same side, for example above the workpiece 3, the geometric axes 30 of laser beam 22, and 31 of coolant jet 27, preferably intersect on surface 22 of workpiece 3, or at an imaginary point therebelow. However, this is not absolutely necessary for a satisfactory operation. For clarity, the diameter of the laser beam 22 is exagerated, actually this diameter is of the order of about 1/10 mm. The water jet, on the contrary may have a diameter of several millimeters and even more. Insofar as the beam and the jet are not required to impinge on the workpiece surface 32 at exactly the same spot; even if their points of incidence are laterally offset, the workpiece zone at the instantaneous cutting point is cooled by the coolant jet 27 to a satisfactory extent.

It is further advantageous to associate the upper surface 32 of workpiece 3 with the tool part 23 of laser cutter 19, and the underside 33 of the workpiece with the discharge nozzle 26. Also, cooling with a liquid may be provided at both the upper and lower surfaces of the workpiece. A ring of nozzles (not shown) around laser beam 22 or a correspondingly designed tubular nozzle discharging a water apron, may be provided instead of a single, laterally mounted nozzle.

The workpiece feed is controlled through a control section 34 particularly comprising a program control by which the workpiece is moved in a manner exactly predetermined by a program, relative to stationary tool part 23 of laser cutter 19. This control section 34 may also be employed for controlling pump 28, so that the discharged liquid amount is varied, for example, increased, as a function of the curvature of the laser track 35 or of another criterion such as parallel cutting tracks. Primarily, at locations 36 where some discontinuity appears in the path, or in portions 37 have a small radius, the cooling must be intensified because of the reduced traveling speed of workpiece 3 or even of a temporary standstill thereof. The same applies if narrow portions 38 are to be cut out, where the heat dissipation through adjacent material zones is obstructed or at least substantially reduced.

A temperature sensor 42 may also be used for coolant or beam control and is connected to control section 34.

While a specific embodiment of the invention has been shown and described in detail to illustrate the application of the principles of the invention, it will be understood that the invention may be embodied otherwise without departing from such principles.

What is claimed is:

1. A device for cutting workpieces in particular metal sheets comprising a work station over which the workpiece is movable, a laser device mounted over said work station and positioned for directing a laser beam at the workpiece at the station, means for directing a fluid coolant against the workpiece adjacent the laser beam, said means including a nozzle for directing a jet of coolant to the workpiece near a spot of the laser beam on the workpiece adjacent at least one of an entrance and exit point of said laser beam, control means for controlling the pressure and amount of the coolant supplied to the workpiece, means for shifting the workpiece, longitudinally and laterally relative to the laser beam, and workpiece movement control means for varying the movement of the workpiece so as to obtain a maximum displacement relative to the laser beam in accordance with the curvature and movement of the line to be cut, said control means being operable to vary the amount of fluid coolant in accordance with the type of cut which is being made by said workpiece movement control means.

2. A device according to claim 1, including means for varying the intensity of the laser beam and means being connected to said control for the fluid coolant to vary the fluid in accordance with the intensity of the laser beam.

3. A method of cutting workpieces by means of a laser beam comprising: displacing the workpiece relative to the laser beam to move the laser beam over the workpiece to effect the cutting thereof along a line; applying a coolant to the workpiece in the vicinity of the laser beam in accordance with the displacement of the workpiece; and varying the coolant as a function of the shape of a curve being cut by the laser.

4. A method according to claim 3, including sensing the temperature of the workpiece and varying the coolant supply to the workpiece accordingly.

5. A method according to claim 3, wherein the workpiece is punched at a location adjacent the laser beam for effecting desired punched out operations in addition to laser cutting.

6. A device for cutting workpieces in particular metal sheets comprising a work station over which the workpiece is movable, a laser device mounted over said work station and positioned for directing a laser beam at the workpiece at the station, means for directing a fluid coolant against the workpiece adjacent the laser beam, said means including a nozzle for directing a jet of coolant to the workpiece near a spot of the laser beam on the workpiece adjacent at least one of an entrance and exit point of said laser beam, and means for mounting said nozzle for displacement along a path around a geometric axis of the laser beam.

7. A device for cutting workpieces in particular metal sheets comprising a work station over which the workpiece is movable, a laser device mounted over said work station and positioned for directing a laser beam at the workpiece at the station, means for directing a fluid coolant against the workpiece adjacent the laser beam, said means including a nozzle for directing a jet of coolant to the workpiece near a spot of the laser beam on the workpiece adjacent at least one of an entrance and exit point of said laser beam, control means for controlling the pressure and amount of the coolant supplied to the workpiece, said control means for controlling the flow of coolant comprising a programmed control, and means for shifting the workpiece relative to the laser beam connected to the programmed control.

8. A device for cutting workpieces in particular metal sheets comprising a work station over which the workpiece is movable, a laser device mounted over said work station and positioned for directing a laser beam at the workpiece at the station, means for directing a fluid coolant against the workpiece adjacent the laser beam, said means including a nozzle for directing a jet of coolant to the workpiece near a spot of the laser beam on the workpiece adjacent at least one of an entrance and exit point of said laser beam, control means for controlling the pressure and amount of the coolant supplied to the workpiece, means for sensing the temperature of the workpiece, said control means connected to said sensing means for varying the supply of coolant in accordance with the temperature of the workpiece.

* * * * *